Figure 1:
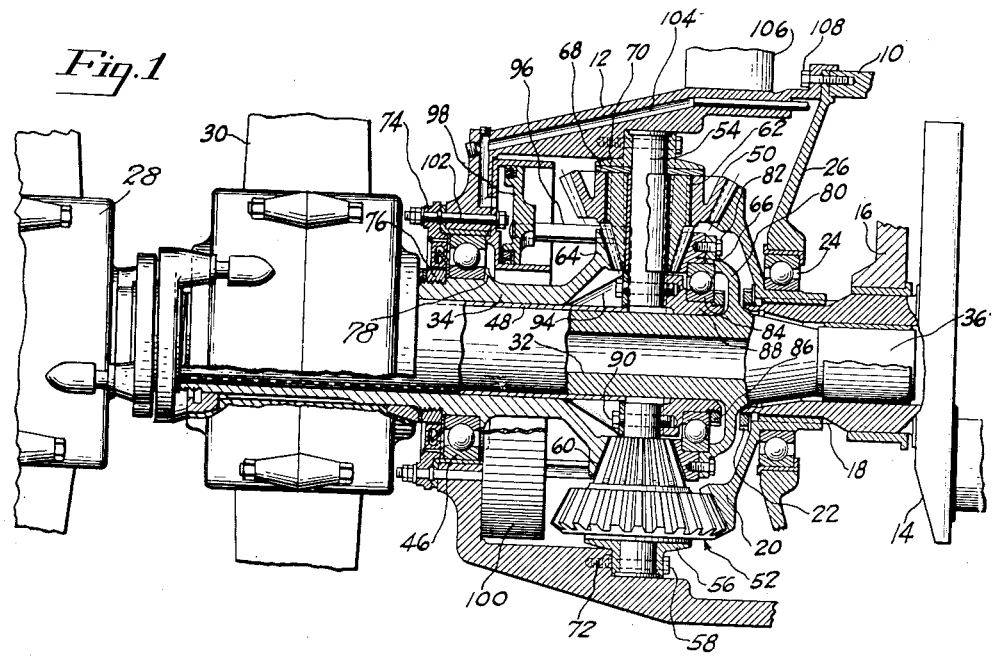

Oct. 11, 1938.  A. H. KING  2,132,481
PROPELLER DRIVE FOR COAXIAL OPPOSITELY ROTATING PROPELLERS
Filed April 25, 1936

INVENTOR.
Alexander H. King
BY Harris G. Luther
ATTORNEY

Patented Oct. 11, 1938

2,132,481

UNITED STATES PATENT OFFICE 2,132,481

PROPELLER DRIVE FOR COAXIAL OPPOSITELY ROTATING PROPELLERS

Alexander H. King, West Hartford, Conn., assignor to United Aircraft Corporation, East Hartford, Conn., a corporation of Delaware Application April 25, 1936, Serial No. 76,435

1 Claim. (Cl. 170—165)

This invention relates to improvements in propeller drives for coaxial oppositely rotating propellers and has particular reference to a drive for driving a pair of coaxial aeronautical propellers in opposite directions at a speed different from the speed of the driving power plant.

An object of the invention resides in the provision of a suitable gear mechanism for driving a pair of oppositely rotating propellers in opposite directions at a speed different from the speed of the propeller driving engine, so constructed that it is compact and small in external dimensions to fit within the restricted limits of the fixed nose portion of the engine, and at the same time is light in weight so that it will not add materially to the dead load of the airplane.

A further object resides in the provision of a gear mechanism of the character described which has a large factor of safety so that it will not fail in service or be subject to undue wear.

A further object resides in the combination with a gear mechanism of the character described of operating means for controlling the pitch of a pair of controllable pitch propellers driven by the improved propeller drive.

Other objects and advantages will be more particularly pointed out hereinafter, or will become apparent as the description proceeds.

In the accompanying drawing in which like reference numerals are used to designate similar parts throughout, there is illustrated a suitable mechanical embodiment of what is now considered to be the preferred form of the invention. The drawing, however, is for the purpose of illustration only and is not to be taken as limiting the invention, the scope of which is to be measured entirely by the scope of the appended claim.

Figure 2:
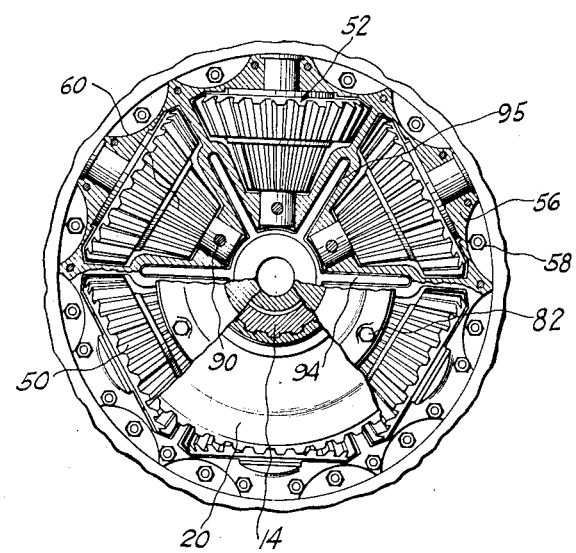

In the drawing, Fig. 1 is a vertical sectional view through a propeller driving mechanism constructed according to the idea of this invention, and Fig. 2 is a rear elevational view of the propeller driving mechanism illustrated in Fig. 1, certain portions being broken away to better illustrate the construction thereof.

Referring to the drawing in detail, the numeral 10 indicates a fragmentary portion of the crankcase or other structure of a suitable engine such as a radial air cooled internal combustion engine commonly employed for the propulsion of airplanes. It is to be understood, however, that the invention is not limited in its application to an engine of any particular character, but may be used with any suitable power plant for driving a pair of oppositely rotating propellers in opposite directions at a speed different from the speed of the propeller driving power plant. The numeral 12 indicates a fixed nose section of the engine detachably secured to the crankcase 10, and the numeral 14 indicates a suitable drive shaft such as the crankshaft of an internal combustion engine.

The forward end of the drive shaft 14 is hollow and is supported by a suitable front bearing 16 mounted in the fixed portion of the engine. Adjacent to its forward end the drive shaft is provided with a series of external splines 18 upon which is mounted a cylindrical skirt portion of a beveled ring gear 20, the skirt portion being provided with splines corresponding with the splines 18 to provide a driving connection between the drive shaft and the ring gear. The ring gear is secured in operative position upon the forward end of the drive shaft by means of a thrust nut 22 screw threaded upon the extreme forward end of the drive shaft and is radially centered with respect to the fixed portions of the engine by means of an anti-friction bearing 24, the inner race of which bears upon the outer surface of the cylindrical skirt portion of the ring gear and the outer race of which is supported in a suitable web member 26 detachably secured to the fixed portion of the engine. The propellers 28 and 30 are carried and driven respectively by a pair of propeller shafts or driven shafts 32 and 34, the inner shaft 32 being disposed for a portion of its length within the tubular outer shaft 34. At its rear end the inner driven shaft 32 is provided with a reduced extension 36 which is received within the hollow forward portion of the drive shaft 14 to provide a spigot bearing between the inner propeller shaft and the drive shaft so that the rear end of the inner driven shaft is radially centered with respect to the fixed portion of the engine, by means of this spigot bearing and the bearings 16 and 24. The outer driven shaft is centered with respect to the fixed portion of the engine by means of the centering and propeller thrust load bearing 46 and the two shafts are centered with respect to each other by suitable means such as the bearing sleeve indicated at 48. The beveled ring gear 20 is provided on its forward face with a series of gear teeth which mesh with the teeth of a plurality of gear elements 50 of compound beveled pinions generally indicated at 52. The various compound beveled pinion gears are rotatably mounted on fixed axles 54 supported in an annular cage 56 which is rigidly secured to the engine nose section 12 by suitable means such as the cap screws 58. From this construction it will be observed that when the beveled ring gear 20 is rotated by the drive shaft 14, the pinion gears 52 will be caused to rotate about the fixed axles 54 by reason of intermeshing of the ring gear with the gear elements 50.

Each of the compound beveled pinion gears is provided in addition to the gear elements 50 with a second gear element 60. Preferably, the gear elements 60 are formed integrally with a hollow shaft which surrounds the respective fixed axle 54 and upon which the gear element 50 is operatively secured by suitable means such as the interengaging splines 62. From this construction it will be observed that the gear elements 60 are caused to rotate upon rotation of the gear elements 50 by the ring gear 20. The gear elements 60, in the form of the device illustrated, are smaller than the elements 50 and are disposed radially inward with respect to the driven shafts 32 and 34.

The outer driven shaft 34 is provided with an integral beveled ring gear 64 which meshes with the teeth of the gear elements 60 upon the forward side of the axles 54 and the inner driven shaft 32 is provided with a detachable beveled ring gear 66 which meshes with the teeth of the gear elements 60 upon the rearward side of the gear elements. If the fixed axles 54 are disposed so that their axes are at right angles to the axis of the shafts 32 and 34, these shafts will now be rotated in opposite directions at the same speed, upon rotation of the gear elements 50 by the driving ring gear 20. If a difference in the speeds of the two shafts 32 and 34 is desired, the axles 54 may be disposed so that their axes are at an angle other than 90 degrees to the axis of the shafts 32 and 34.

As stated above, the driving ring gear 20 is positioned by the anti-friction thrust bearing 24, the pinions are positioned by flat thrust bearings as indicated at 68 disposed between the outer portions of the pinions and bearing extensions 70 provided on the cage 56, the cage itself being solidly secured in the fixed nose portion 12 by means of the cap screws 58 which force the circumferential portion of the cage against an annular shoulder 72 provided in the interior of the fixed nose portion. Thus, the bearings 24 and 68 serve to maintain the gear elements 50 in proper mesh with the drive ring gear 20. The outer driven shaft 34 is positioned with respect to the fixed nose portion 12 by means of the anti-friction bearing 46, the outer race of which is firmly secured in the fixed nose portion between bearing cover 74 and a fixed annular cylinder member presently to be described, and the inner race of which is secured upon the shaft 34 by means of the bearing nut 76 screw threaded upon the shaft which clamps the inner race of the bearing against an annular shoulder 78 formed integrally on the shaft. Thus, the bearing 46 serves to maintain the driven shaft ring gear 64 in accurate mesh with the teeth of the gear elements 60.

The inner driven shaft 32 is provided with a radial flange 80 upon which the ring gear 66 is secured by suitable means such as the bolts 82. The outer race of a bearing 84 is clamped between a portion of the flange 80 and a corresponding portion of the gear 66 within the gear and the inner race of this bearing 84 is firmly secured by the nut 86 upon an extension 88 formed upon the inner portion of the cage 56. Thus the shaft 32 and ring gear 80 are definitely located with respect to the cage by means of the anti-friction bearing 84 and the teeth of the ring gear 66 are maintained accurately in mesh with the teeth of the gear elements 60.

Preferably, the cage 56 is formed in two separate portions divided along a plane including the axes of the axles 54 so that the axles and the pinion gears carried thereby may be readily mounted in the cage. The two parts of the cage are rigidly secured together in operative relationship by means of cap screws 58 and the additional cap screws 90 which extend through the radially inner portion of the cage and through the inner ends of the axles 54 to restrain the axles against movement or rotation during operation of the gear mechanism.

From the above description it will be observed that the corresponding gear elements are maintained accurately in mesh at all times and that the load of the propeller 30 upon the shaft 34 is taken by the anti-friction thrust bearing 46, while the load of the propeller 28 upon the shaft 32 is taken by the anti-friction thrust bearing 84 and transmitted to the fixed cage 56. By proper proportioning the sizes of the driving ring gear 20, the gear elements 50, the gear elements 60, and the driven shaft ring gears 64 and 80, any desired difference between the rotational speed of the drive shaft 14 and driven shafts 32 and 34 may be obtained.

As explained above, it is among the objects of the invention to provide a gearing suitable for driving oppositely rotating controllable pitch propellers and with this object in view the propellers 28 and 30 may be any one of several types of controllable pitch propellers of a construction well-known to the art. As one illustrative method of operation, the movable blades of the propellers 28 and 30 may be operatively connected to the axially slidable sleeve 48 disposed between the outer driven shaft 34 and the inner driven shaft 32 by suitable means such, for example, as shown in application Serial No. 66,392, filed February 29, 1936, by Erle Martin, for Oppositely rotating propellers. This sleeve extends rearwardly from the space between the two propellers and terminates within the cage 56 where it is provided with a plurality of radial arms 94, the cage being provided with suitable slots or recesses 95 to receive the arms. Each of the arms 94 is provided with a forwardly extending portion 96 disposed substantially parallel to the axis of the shafts 32 and 34, such extensions being connected at their forward ends to an annular piston 98 reciprocable in a fixed annular cylinder 100 secured in the forward end of the engine nose section 12 by suitable means such as rearward extensions on the bolts 102 which secure the bearing cover 74 to the nose section. Hydraulic fluid is supplied to the space between the piston 98 and the closed end of the cylinder 100 through a suitable fluid passage 104 which may lead through a suitable speed controlling governor 106 or other control devices.

From this description it will be observed that when fluid under pressure is supplied through the passage 104 to the cylinder 100, the piston 98 will be forced rearwardly and will cause a rearward movement of the sleeve 48 axially of the shafts 32 and 34. Suitable centrifugally acting means such as the counterweights shown in Patent No. 2,032,255 to F. W. Caldwell or the centrifugal twisting moments of the blades themselves are provided or utilized to turn the propeller blades in the opposite direction and cause a forward movement of the sleeve 48 upon release of the hydraulic fluid from the cylinder 100.

In assembling the above described gear mechanism the cylinder 100, the bearing 46, and the bearing cover 74 may first be assembled in the nose section 12. The annular piston 98 is applied over the forward end of the driven shaft 34, the sleeve member 92 is then inserted in the shaft so that the arms 96 pass over the gear 64 and the forward ends of the arms are then permanently secured to the piston 98. The outer driven shaft 34 with the sleeve 92 and piston 98 assembled therewith, may then be inserted through the bearing 46 and the clamp nut 76 applied to definitely locate the shaft in the bearing and position in the cylinder 100. Next, the cage 56 with the pinion gears 52 assembled therein may be inserted in the nose section 12 and the cap screws 58 applied so that the teeth of the gear elements 60 will mesh with the teeth of the ring gear 64. The ring gear 66 may now be applied so that the teeth thereof mesh with the teeth of the gear elements 60 and the bearing 84 inserted to maintain the ring gear in position, the bearing being clamped upon the cage extension 86 by the clamp nut 88. The inner driven shaft 32 may then be inserted through the sleeve 92 and the cap screws 82 applied to secure the flange portion 80 of the shaft secured to the ring gear 66. The driving ring gear 20 having been mounted upon the forward end of the drive shaft 14 and secured thereon by tightening the clamp nut 22, the nose section 12 with the gearing assembled therein may now be applied to the engine so that the teeth of the gear elements 50 mesh with the teeth of the ring gear 20 and the nose section may be rigidly secured in this operative position by suitable means such as the cap screws 108. The propellers 28 and 30 may be mounted upon the respective shafts 32 and 34 either before or after the nose section 12 is applied to the engine, if they are mounted before the nose section is applied to the engine, the entire unit including the nose section, the propeller drive gearing, and the propellers may be mounted upon and removed from the engine as a unit by releasing the nose section cap screws 108.

While there has been illustrated and described a particular mechanical embodiment of the idea of the invention, it is to be understood that the invention is not limited to the particular embodiments so illustrated and described, but that such changes in the size, shape, and arrangement of parts may be resorted to as come within the scope of the subjoined claim.

Having now described the invention so that others skilled in the art may clearly understand the same, what it is desired to secure by Letters Patent is as follows:

In a propeller drive for oppositely rotating controllable pitch propellers, an engine drive shaft, a pair of propeller carrying coaxial driven shafts, a beveled gear train comprising a ring gear on each of said driven shafts, a ring gear on said engine drive shaft, a plurality of pinion gears driven by the ring gear on said drive shaft and driving the ring gears on said driven shafts in opposite directions, and a fixed cage for mounting said pinion gears, a propeller adjusting sleeve between said driven shafts terminating at one end within said cage, a fixed annular cylinder adjacent to said cage, a piston reciprocable in said cylinder, arms on said sleeve extending through slots in said cage to connect said sleeve with said piston, and means for supplying hydraulic fluid to said piston.

ALEXANDER H. KING.